US008473280B2

(12) United States Patent
Al-Omari et al.

(10) Patent No.: US 8,473,280 B2
(45) Date of Patent: Jun. 25, 2013

(54) SYSTEM AND METHODS FOR COST-EFFECTIVE BILINGUAL TEXTING

(75) Inventors: Hussein K. Al-Omari, Riyadh (SA); Mohammad S. Khorsheed, Riyadh (SA)

(73) Assignee: King Abdulaziz City for Science & Technology, Riyadh (SA)

( * ) Notice: Subject to any disclaimer, the term of this patent is extended or adjusted under 35 U.S.C. 154(b) by 516 days.

(21) Appl. No.: 12/852,449

(22) Filed: Aug. 6, 2010

(65) Prior Publication Data

US 2012/0034939 A1 Feb. 9, 2012

(51) Int. Cl.
*G06F 17/20* (2006.01)
*G06F 17/28* (2006.01)
*G06F 17/27* (2006.01)
*G06F 17/21* (2006.01)
*H04W 4/00* (2009.01)

(52) U.S. Cl.
USPC .......... 704/9; 704/1; 704/2; 704/3; 704/4; 704/5; 704/6; 704/7; 704/8; 704/10; 715/256; 715/257; 715/258; 715/259; 715/260; 715/261; 715/262; 715/263; 715/264; 455/466

(58) Field of Classification Search
USPC ............... 704/1–10; 715/256–264; 455/466
See application file for complete search history.

(56) References Cited

U.S. PATENT DOCUMENTS

| 5,784,069 | A * | 7/1998 | Daniels et al. ............ 345/467 |
| 6,778,950 | B2 * | 8/2004 | Gohari ...................... 704/2 |
| 7,031,906 | B2 * | 4/2006 | Shimohata et al. ......... 704/2 |
| 7,177,794 | B2 * | 2/2007 | Mani et al. ................ 704/8 |
| 7,398,199 | B2 * | 7/2008 | Gong ........................ 704/8 |
| 7,418,390 | B1 * | 8/2008 | Jokipii ................... 704/270.1 |
| 7,636,083 | B2 * | 12/2009 | Aoki et al. ............... 345/172 |
| 7,642,932 | B2 * | 1/2010 | Cui et al. ................. 341/22 |
| 7,660,594 | B2 * | 2/2010 | Chava et al. ............. 455/466 |
| 7,890,525 | B2 * | 2/2011 | Lu et al. .................. 707/763 |
| 2003/0040909 | A1 * | 2/2003 | Ghali ...................... 704/235 |

(Continued)

FOREIGN PATENT DOCUMENTS

EP 2113845 A1 * 11/2009

OTHER PUBLICATIONS

Davis, Mark. Unicode Regular Expression Guidelines. Unicode Technical report # 18. Nov. 23, 1999.*

(Continued)

*Primary Examiner* — Paras D Shah
(74) *Attorney, Agent, or Firm* — SV Patent Service (57) ABSTRACT

A method for facilitating texting in a non-Latin-based language includes storing mapping between a non-Latin-based language and a Latin-based language in a computer storage. The characters in the non-Latin-based language are mapped to a first group of characters in the Latin-based language. The diacritics in the non-Latin-based language are mapped to a second group of characters in the Latin-based language. The characters in the non-Latin-based language in a texting message are converted into in the coded text comprising characters in the Latin-based language according to the mapping. The texting message having the coded text is transmitted from a first communication device to a second communication device. The characters of the Latin-based language in the coded text are converted back into the characters in the non-Latin-based language according to the mapping to allow a user to read the text message in the non-Latin-based language on the second communication device.

20 Claims, 6 Drawing Sheets

U.S. PATENT DOCUMENTS

| | | | |
|---|---|---|---|
| 2006/0143207 A1* | 6/2006 | McQuaid et al. | 707/101 |
| 2008/0221866 A1* | 9/2008 | Katragadda et al. | 704/8 |
| 2009/0144049 A1* | 6/2009 | Haddad et al. | 704/3 |
| 2010/0002004 A1* | 1/2010 | Raghunath et al. | 345/467 |
| 2010/0122203 A1* | 5/2010 | Bouta | 715/780 |
| 2010/0262418 A1* | 10/2010 | Musa | 704/2 |
| 2011/0054881 A1* | 3/2011 | Bhalerao | 704/2 |

OTHER PUBLICATIONS

M.G.A. Malik. 2006. Punjabi Machine Transliteration.Proceedings of the 21st International Conference onComputational Linguistics and the 44th annual meet-ing of the ACL, pp. 1137-1144.*

Blokhin, Vitaly. Transliteration Tables. Vital Network, Apr. 17 2009, http://web.archive.org/web/20090417085805/http://www.uconv.com/translit.htm.*

T. Ahmed,. "Roman to Urdu transliteration usingwordlist", submitted to Conference of Language andTechnology 2009, Lahore, 2009.*

Larkey, Leah, Nasreen AbdulJaleel, and Margaret Connell. "What's in a Name?: Proper Names in Arabic Cross Language Information Retrieval." ACL Workshop on Comp. Approaches to Semitic Languages. 2003.*

* cited by examiner

Mapping between Arabic Characters and English Characters

| Original Arabic Text | Coded Text in English |
|---|---|
| 29 Characters | 29 Upper-case and lower-case characters |
| Arabic diacritics | A second group of Upper-case and lower-case characters |
| Arabic numbers | Arabic numerals |
| Punctuations | Punctuations |
| Beginning marker | Special character "|" or "~" |
| Ending marker | Special character "|" or "~" |
| Special character "~" | "~~" |
| Special character "|" | "||" |

Figure 2

SMS Arabic Conversion Table

| Index | Unicode Value | Arabic Character | English Mapping |
|---|---|---|---|
| 1 | 1563 | ؛ | A |
| 2 | 1566 | ؞ | B |
| 3 | 1567 | ؟ | C |
| 4 | 1569 | ء | D |
| 5 | 1570 | آ | E |
| 6 | 1571 | أ | F |
| 7 | 1572 | ؤ | G |
| 8 | 1573 | إ | H |
| 9 | 1574 | ئ | I |
| 10 | 1575 | ا | J |
| 11 | 1576 | ب | K |
| 12 | 1577 | ة | L |
| 13 | 1578 | ت | M |
| 14 | 1579 | ث | N |
| 15 | 1580 | ج | O |
| 16 | 1581 | ح | P |
| 17 | 1582 | خ | Q |
| 18 | 1583 | د | R |
| 19 | 1584 | ذ | S |
| 20 | 1585 | ر | T |
| 21 | 1586 | ز | U |
| 22 | 1587 | س | V |
| 23 | 1588 | ش | W |
| 24 | 1589 | ص | X |

Figure 3

SMS Arabic Conversion Table

| Index | Unicode Value | Arabic Character | English Mapping |
|---|---|---|---|
| 25 | 1590 | ض | Y |
| 26 | 1591 | ط | Z |
| 27 | 1592 | ظ | a |
| 28 | 1593 | ع | b |
| 29 | 1594 | غ | c |
| 30 | 1600 | ـ | d |
| 31 | 1601 | ف | e |
| 32 | 1602 | ق | f |
| 33 | 1603 | ك | g |
| 34 | 1604 | ل | h |
| 35 | 1605 | م | i |
| 36 | 1606 | ن | j |
| 37 | 1607 | ه | k |
| 38 | 1608 | و | l |
| 39 | 1609 | ى | m |
| 40 | 1610 | ي | n |
| 41 | 1611 | ً | o |
| 42 | 1612 | ٌ | p |
| 43 | 1613 | ٍ | q |
| 44 | 1614 | َ | r |
| 45 | 1615 | ُ | s |
| 46 | 1616 | ِ | t |
| 47 | 1617 | ّ | u |
| 48 | 1618 | ْ | v |

Figure 3 Continued

Examples of Arabic SMS Messages and Corresponding Coded Text in English

| Original Arabic Text | Coded Text in English |
|---|---|
| Hello, السلام عليكم | Hello, \|JhVhJi bhngi\| |
| How are you? كيف حالكم؟ | How are you? \|gne PJhgiC\| |

Figure 4

SYSTEM AND METHODS FOR COST-EFFECTIVE BILINGUAL TEXTING

BACKGROUND

The present application relates generally to technologies for providing texting on telecommunication devices.

Telecommunication companies that offer mobile phone services in many parts of the world have a maximum number of characters for each text message. The maximum number becomes smaller when the language used in the text message is not Latin-based. For instance, in the Middle East, most mobile phones support English, French, Arabic, Urdu, and Farsi languages. The maximum number of characters in SMS messages for English alone, French alone, or English and French is 160. This limit is reduced to 70 characters when Arabic, Urdu, or Farsi is used alone or in conjunction with English or French. For instance, the limit is reduced from 160 characters to 70 characters if even one Arabic character is added to an English text message. A message longer than the limit is charged as multiple messages by the telecommunication companies, which significantly increases the costs to the customers.

It is therefore desirable to provide methods to allow users to send text messages in different languages with increase information content and lower cost.

SUMMARY

In a general aspect, the present invention relates to a method for facilitating texting in a non-Latin-based language. The method includes storing mapping between a non-Latin-based language and a Latin-based language in a computer storage, wherein the characters in the non-Latin-based language are mapped to a first group of characters in the Latin-based language, wherein the diacritics in the non-Latin-based language are mapped to a second group of characters in the Latin-based language; converting characters in the non-Latin-based language in a texting message into a coded text comprising characters in the Latin-based language according to the mapping stored on the computer storage; transmitting the texting message having the coded text in the Latin-based language from a first communication device to a second communication device; and converting the characters of the Latin-based language in the coded text back into the characters in the non-Latin-based language according to the mapping to allow a user to read the text message in the non-Latin-based language on the second communication device.

Implementations of the system may include one or more of the following. The mapping can define that the punctuations in the non-Latin-based language are mapped to punctuations in the Latin-based language. The mapping can define that the numbers in the non-Latin-based language are mapped to Arabic numbers in the Latin-based language. The mapping can define one or more characters in the non-Latin-based language as separator markers to indicate the beginning and the end of text in the non-Latin-based language in the text message. The texting message can include a first portion in the non-Latin-based language and a second portion in the Latin-based language. The method can further include inserting a first separator marker at the beginning of the coded text; and inserting a first separator marker at the end of the coded text. The non-Latin-based language can include Arabic, Urdu, or Farsi. The non-Latin-based language can include 29 Arabic characters and their associated variation forms. The Latin-based language can include English or French. The Latin-based language can include N pairs of upper case characters and lower case characters, wherein N is a positive integer, wherein the non-Latin-based language comprising M characters, wherein M is a positive integer smaller than 2N. The first group of characters in the Latin-based language can include upper case characters and lower case characters.

In another general aspect, the present invention relates to method for facilitating texting in a non-Latin-based language. The method includes storing mapping between a non-Latin-based language and a Latin-based language in a computer storage, wherein the characters in the non-Latin-based language are mapped to a first group of characters in the Latin-based language, wherein the diacritics in the non-Latin-based language are mapped to a second group of characters in the Latin-based language, wherein the non-Latin-based language includes Arabic, Urdu, or Farsi, wherein the Latin-based language that includes English or French; converting characters in the non-Latin-based language in a texting message into a coded text comprising characters in the Latin-based language according to the mapping stored on the computer storage; transmitting the texting message having the coded text in the Latin-based language from a first communication device to a second communication device; and converting the characters of the Latin-based language in the coded text back into the characters in the non-Latin-based language according to the mapping to allow a user to read the text message at least partially in the non-Latin-based language on the second communication device.

In another general aspect, the present invention relates to a computer program product comprising a computer useable medium having computer readable program code functions embedded in said medium for causing a computer to store mapping between the non-Latin-based language and the Latin-based language in a computer storage, wherein characters in the non-Latin-based language are mapped to a first group of characters in the Latin-based language, wherein the diacritics in the non-Latin-based language are mapped to a second group of characters in the Latin-based language, to convert characters in the non-Latin-based language in a texting message into a coded text comprising characters in the Latin-based language according to the mapping stored on the computer storage, and to transmit the texting message having the coded text in the Latin-based language from a first communication device to a second communication device, wherein the characters of the Latin-based language in the coded text are to be converted back into the characters in the non-Latin-based language according to the mapping to allow a user to read the text message in the non-Latin-based language on the second communication device.

The systems and methods described in the present application provide convenient and cost effective ways for customers to communicate in non-Latin-based languages such as Arabic, Urdu, and Farsi. In another aspect, the number of characters allowed in each Arabic, Urdu, or Farsi text message can be significantly increased to allow more information per message.

Although the invention has been particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

The following drawings, which are incorporated in and form a part of the specification, illustrate embodiments of the present invention and, together with the description, serve to explain the principles of the invention.

DETAILED DESCRIPTION

The presently disclosed methods relates to a new technology that can increase the information content and reduce costs in mobile text messages comprising non-Latin-based languages such as Arabic, Urdu, Farsi, or and any other language that uses the Arabic Alphabet. In some cases, the number of characters allowed in each non-Latin text message can be increased by more the two times.

In accordance to the present invention, the term text message, texting, or SMS refers to text messaging provided by short message service (SMS). SMS is based on standardized communications protocols that allow the exchange of short text messages between fixed line or mobile phone devices. SMS text messaging is the most widely used data application in the world, with 2.4 billion active users to date, or 74% of all mobile phone subscribers. The term SMS is used as a synonym for all types of short text messaging, as well as the user activity itself Most SMS messages are mobile-to-mobile text messages, though the standard supports other types of broadcast messaging and texting messaging between mobile devices and computers using Internet services such as Yahoo chat; AOL instant messaging, Google's G Chat, and Facebook chat.

Figure 1:
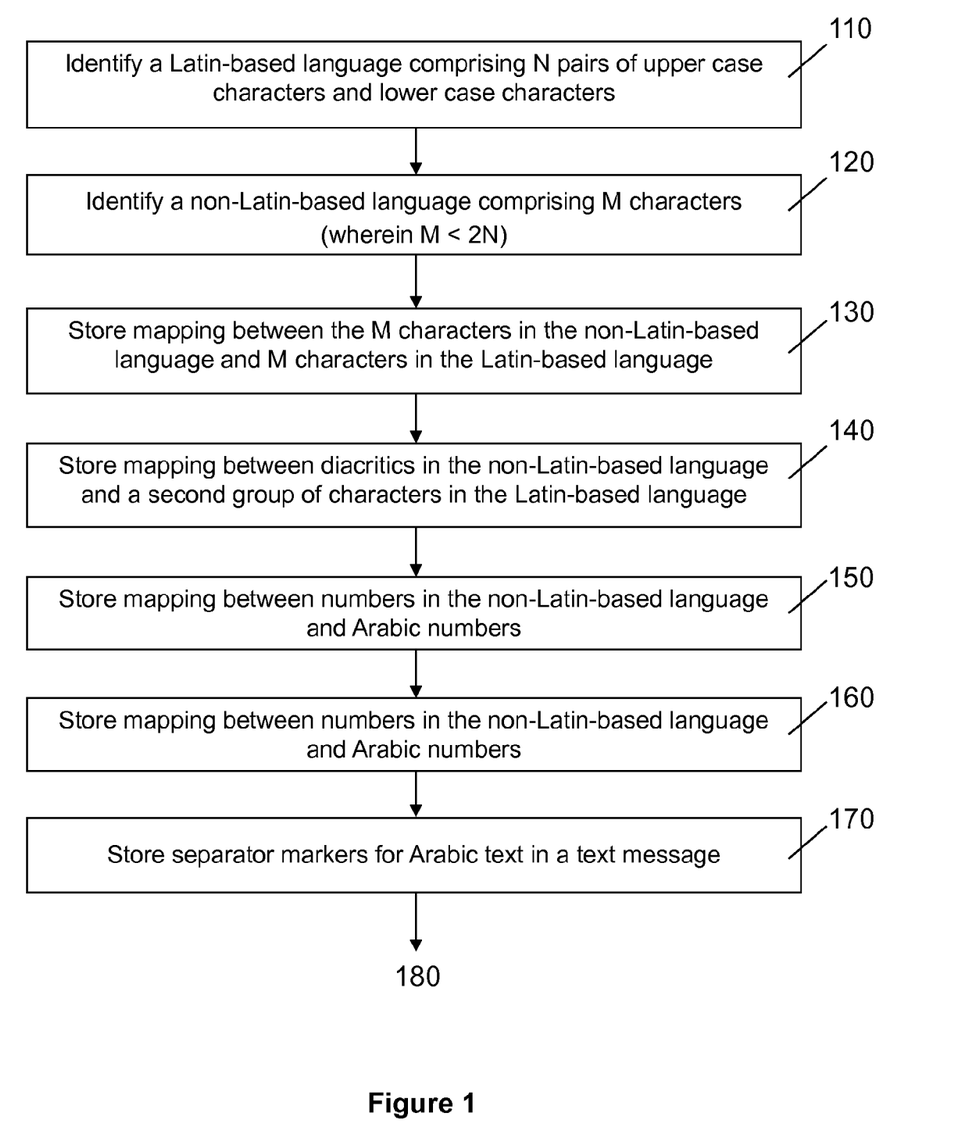
FIG. 1 is a flow diagram for providing cost-effective and information-rich text messaging in a non-Latin-based language such as Arabic, Urdu, or Farsi.
Figure 2:
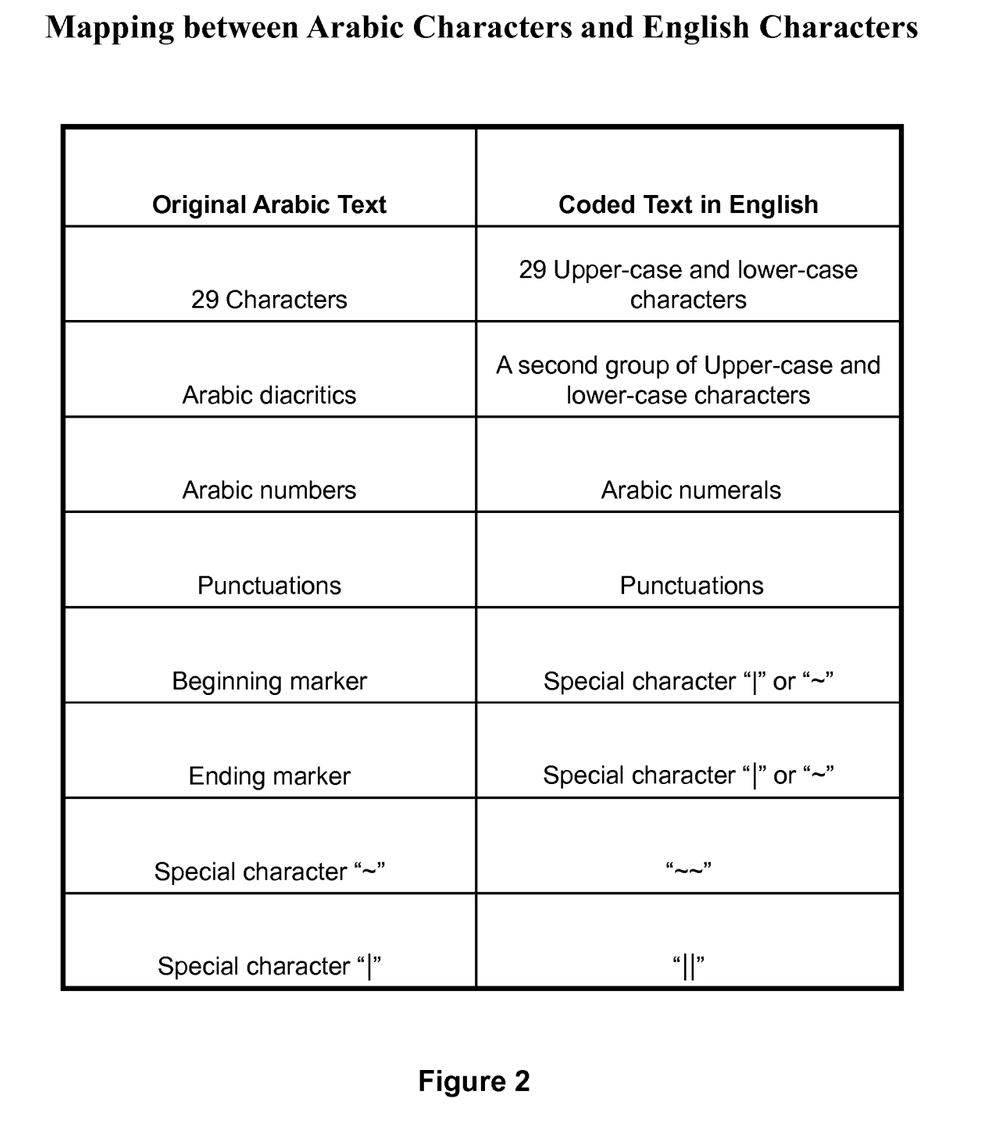
FIG. 2 illustrates exemplified mapping between Arabic and English for providing cost-effective and information-rich text messaging.

Referring to FIGS. 1 and 2, text messages can be written in a Latin-based language such as English, French, Spanish, German, or other Latin-based language supported by mobile devices (step 110). English alphabet has 26 uppercase characters and 26 lowercase characters. The maximum characters allowed for English in a text message is 160.

In some parts of the world, text messages are commonly written in non-Latin-based languages (step 120), for example, Arabic, Urdu, or Farsi. Arabic has 29 single case characters, which is less than the 52 combined upper case and lower case characters in English. The maximum characters allowed for a text message in Arabic is 70.

Figure 3:
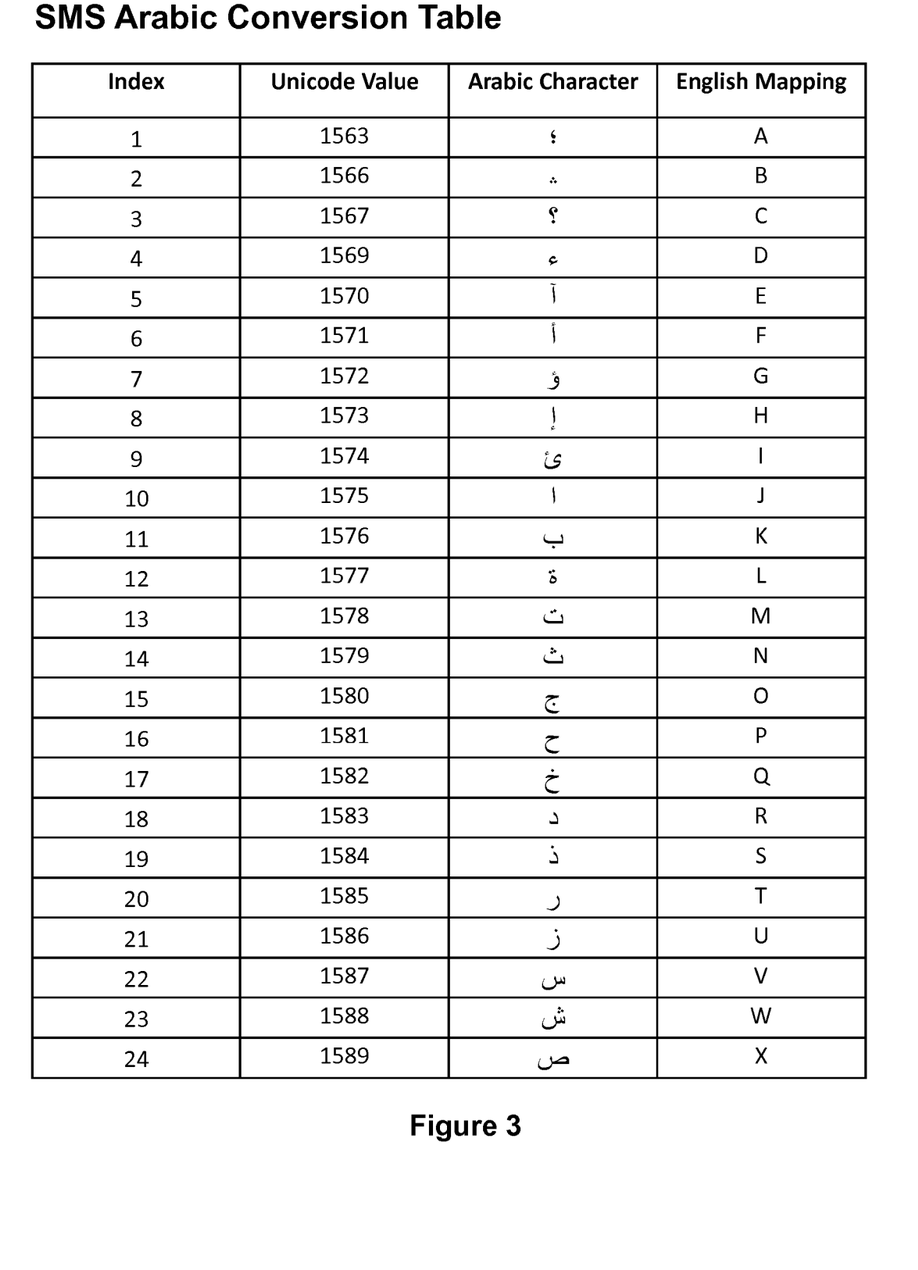
FIG. 3 is a conversion table between Arabic characters and coded characters in English mapping.

A mapping is defined between the non-Latin language and the Latin language and is stored in computer storage. As shown in FIGS. 2 and 3, the Arabic characters (indices 4-40 in FIG. 3) are mapped to a group of upper case and lower case English characters (step 130). The Arabic characters include 29 characters plus variation forms of some of the 29 characters. The Arabic diacritics (indices 41-48 in FIG. 3; the dotted circle represents any Arabic letter) are mapped to a second group of upper case and lower case English characters (step 140).

As shown in FIG. 2, punctuation marks (indices 1-3 in FIG. 3) that are different in Arabic from the Latin-based language are mapped to the corresponding ones in English (step 150). The numbers in Arabic are mapped to the Arabic numerals (step 160). Next, the beginning and end of the mapped Arabic text are marked with special characters as markers (step 170). For example, the special separators like '|' or '~' can be used to respectively indicate the beginning and the end of the Arabic text. The beginning and end markers are used when Arabic text is mixed with a Latin-based language such as English, which helps to identify the portion of the text message where language conversion (or coding) is needed.

The above described mapping relationships between the non-Latin language and the Latin language are one to one. The same scheme can be used when the second language is Urdu or Farsi instead of Arabic. A different mapping table is used for each language.

In operation, the above described mapping can be stored on a first communication device. A user writes a text in the non-Latin-based language in a text message on the first communication device such as a mobile phone. The text in the non-Latin-based language in the text message is first identified (step 180). The text message may be in a single non-Latin-based language such as Arabic, or bilingual with Arabic text in a first portion of the text message and English in a second portion.

The characters in the non-Latin-based language in the text message are then mapped (i.e. converted, or coded) into the first group of characters in the Latin-based language using the above described mapping stored in the computer storage (step 190). The first group of characters can include upper case ad lower case characters. The Latin-based characters representing the Arabic text can be called "coded characters" as exemplified by the English mapping of the Arabic characters in FIG. 3. The conversion can be implemented on a first communication device. If the text message is bilingual, separator markers can be inserted at the beginning and the end of the coded Latin characters. In the case that the text message comprises a single non-Latin-based language, the beginning and end markers may not be needed (step 200).

The text message including the coded text is transmitted from the first communication device to a second communication device (step 210). The text message is treated as a message in the Latin-based language. The first and second communication devices can include mobile phones or other mobile or fixed computer devices. The number of allowed characters and thus the rates for fee charges are applied to the text message as to other texting message in the Latin-based language.

The mapping rules are also stored on the second communication device. When the second communication device receives the text message, the coded characters are identified by the beginning and the ending markers. The coded characters is reversely converted (e.g. decoded) back to non-Latin-based characters according to the same mapping. A user can then read the text message in the non-Latin-based language or bilingual languages (step 220).

In the cases where the original message includes the separator character (e.g. '|' or '~'), as shown in FIG. 2, the special characters can be repeated to show that it is not a beginning or an ending marker for the non-Latin based text. For instance, the vertical bar character "|" in the original message can be converted into "||" for transmission and converted back to "|" on the second communication devices.

Figure 4:
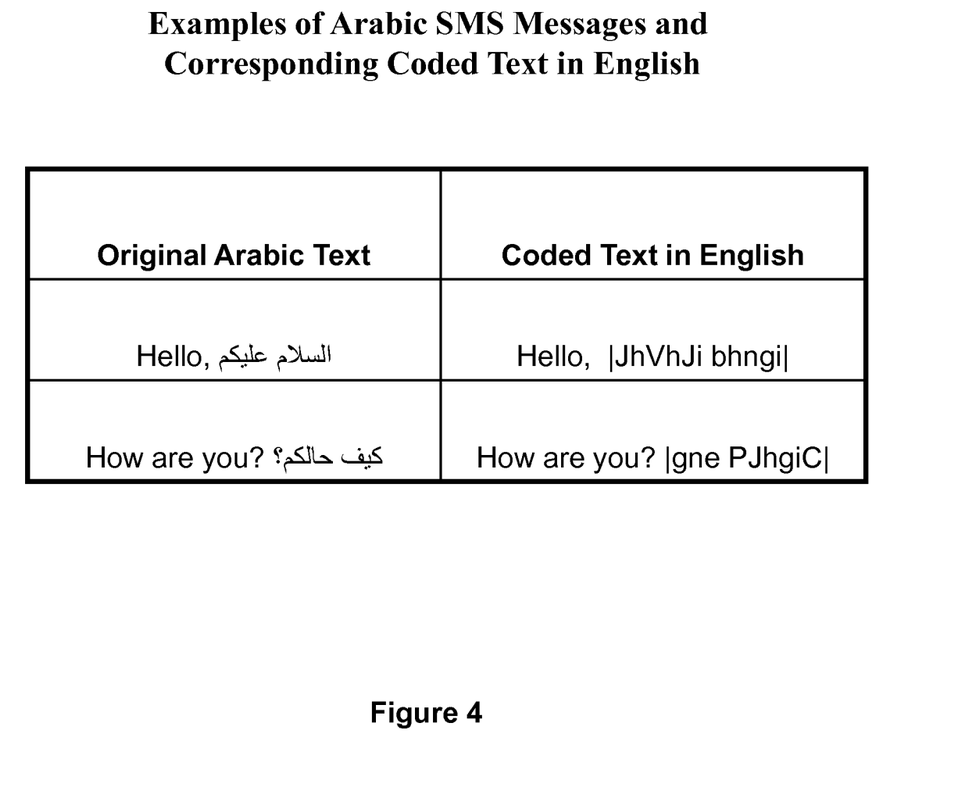
FIG. 4 illustrates examples for converting a bilingual text message comprising a non-Latin-based language to coded texts in English.

FIG. 4 illustrates examples for converting a bilingual text message comprising a non-Latin-based language to coded text in English. For example, the bilingual message "Hello, السلام عليكم" is converted to coded text "Hello, |JhVhJi bhngi|" with the coded characters lead and ended with a separator character '|'. In another example, the bilingual message "How are you? كيف حالكم؟" is converted to coded text "How are you? |gne PJhgiC|" with the coded characters again lead and ended with a separator character '|'.

An advantage of the above disclosed methods is that the maximum number of characters in a text message containing Arabic, Urdu or Farsi is more than doubled from 70 to 150.

While the text message is charged at the same price, the information content is increased significantly increased. For instance, a message of 150 characters in Arabic or in bilingual Arabic/English counts as three messages without using the mapping disclosed in the present application, and counts as a single message when the disclosed method is implemented. The user can thus save two thirds of the cost for transmitting such a message.

It should be understood that the above described methods are not limited to the specific examples used. Configurations can vary without deviating from the spirit of the invention. The disclosed methods are applicable to texting in a single non-Latin based language such as Arabic, Urdu, or Farsi. The disclosed methods are also applicable to multi-lingual texting comprising characters in Arabic, Urdu, or Farsi, and English or French, and other non-Latin and Latin based languages.

Moreover, the specific characters in the Latin-based language used for mapping of diacritics, numerals, the punctuation marks, and the beginning and ending markers for the non-Latin-based text can be different from the examples used above without deviating from the spirit of the invention, and may vary for different languages.

Furthermore, the presently disclosed invention concepts are suitable for mobile-to-mobile, mobile-to-land, or land-to-land communications.

What is claimed is:

1. A method for facilitating texting in a non-Latin-based language, comprising:
    storing mapping between a non-Latin-based language and a Latin-based language in a computer storage, wherein the characters in the non-Latin-based language are mapped to a first group of characters in the Latin-based language, wherein the diacritics in the non-Latin-based language are mapped to a second group of characters in the Latin-based language, wherein the mapping defines one or more special characters in the Latin-based language as separator markers to indicate beginning and end of text in the non-Latin-based language in the text message;
    in a texting message comprising a first portion in the non-Latin-based language and a second portion in the Latin-based language, searching for the one or more special characters in the second portion;
    if the one or more special characters are found in the second portion of the texting message, converting the one or more special characters in the Latin-based language into one or more intermediate characters;
    converting characters in the non-Latin-based language in the first portion of the texting message into a coded text comprising characters in the Latin-based language according to the mapping stored on the computer storage;
    inserting the separator markers at beginning and end of the coded text;
    transmitting the texting message comprising the first portion having the coded text and the second portion from a first communication device to a second communication device; and
    converting the characters of the Latin-based language in the coded text back into the characters in the non-Latin-based language according to the mapping to allow a user to read the text message in the non-Latin-based language on the second communication device.

2. The method of claim 1, wherein the mapping defines that the punctuations in the non-Latin-based language are mapped to punctuations in the Latin-based language.

3. The method of claim 1, wherein the mapping defines that Arabic numerals in the non-Latin-based language are mapped to Arabic numerals in the Latin-based language.

4. The method of claim 1, further comprising:
    removing the separator markers in the transmitted text message; and
    converting the one or more intermediate characters in the transmitted text message back to the one or more special characters in the Latin-based language.

5. The method of claim 1, further comprising:
    inserting a first separator marker at the beginning of the coded text; and
    inserting a second separator marker at the end of the coded text.

6. The method of claim 1, wherein the non-Latin-based language comprises Arabic, Urdu, or Farsi.

7. The method of claim 1, wherein the non-Latin-based language comprises 29 Arabic characters and their associated variation forms.

8. The method of claim 1, wherein the Latin-based language comprises English or French.

9. The method of claim 1, wherein the Latin-based language comprises N pairs of upper case characters and lower case characters, wherein N is a positive integer, wherein the non-Latin-based language comprising M characters, wherein M is a positive integer smaller than 2N.

10. The method of claim 1, wherein the first group of characters in the Latin-based language comprise upper case characters and lower case characters.

11. A method for facilitating texting in a non-Latin-based language, comprising:
    storing mapping between a non-Latin-based language and a Latin-based language in a computer storage, wherein the characters in the non-Latin-based language are mapped to a first group of characters in the Latin-based language, wherein the diacritics in the non-Latin-based language are mapped to a second group of characters in the Latin-based language, wherein the mapping defines one or more special characters in the Latin-based language as separator markers to indicate beginning and end of text in the non-Latin-based language in the text message, wherein the non-Latin-based language includes Arabic, Urdu, or Farsi, wherein the Latin-based language that includes English or French;
    in a texting message comprising a first portion in the non-Latin-based language and a second portion in the Latin-based language, searching for the one or more special characters in the second portion;
    if the one or more special characters are found in the second portion of the texting message, converting the one or more special characters in the Latin-based language into one or more intermediate characters;
    converting characters in the non-Latin-based language in the first portion of the texting message into a coded text comprising characters in the Latin-based language according to the mapping stored on the computer storage;
    inserting the separator markers at beginning and end of the coded text;
    transmitting the texting message comprising the first portion having the coded text and the second portion from a first communication device to a second communication device; and
    converting the characters of the Latin-based language in the coded text back into the characters in the non-Latin-based language according to the mapping to allow a user to read the text message at least partially in the non-Latin-based language on the second communication device.

12. The method of claim 11, further comprising:
removing the separator markers in the transmitted text message; and
converting the one or more intermediate characters in the transmitted text message back to the one or more special characters in the Latin-based language.

13. The method of claim 11, further comprising:
inserting a first separator marker at the beginning of the coded text; and
inserting a second separator marker at the end of the coded text.

14. A computer program product comprising a non-transitory computer useable medium having computer readable program code functions embedded in said medium for causing a computer to:
store mapping between the non-Latin-based language and the Latin-based language in a computer storage, wherein characters in the non-Latin-based language are mapped to a first group of characters in the Latin-based language, wherein the diacritics in the non-Latin-based language are mapped to a second group of characters in the Latin-based language, wherein the mapping defines one or more special characters in the Latin-based language as separator markers to indicate beginning and end of text in the non-Latin-based language in the text message;
in a texting message comprising a first portion in the non-Latin-based language and a second portion in the Latin-based language, search for the one or more special characters in the second portion;
if the one or more special characters are found in the second portion of the texting message, convert the one or more special characters in the Latin-based language into one or more intermediate characters;
convert characters in the non-Latin-based language in the first portion of the texting message into a coded text comprising characters in the Latin-based language according to the mapping stored on the computer storage;
insert the separator markers at beginning and end of the coded text; and
transmitting the texting message comprising the first portion having the coded text and the second portion from a first communication device to a second communication device, wherein the characters of the Latin-based language in the coded text are to be converted back into the characters in the non-Latin-based language according to the mapping to allow a user to read the text message in the non-Latin-based language on the second communication device.

15. The computer program product of claim 14, wherein the mapping defines that the punctuations in the non-Latin-based language are mapped to punctuations in the Latin-based language.

16. The computer program product of claim 14, wherein the mapping defines that Arabic numerals in the non-Latin-based language are mapped to Arabic numerals in the Latin-based language.

17. The computer program product of claim 14, wherein the computer readable program code functions embedded in said medium is further configured for causing a computer to:
remove the separator markers in the transmitted text message; and
convert the one or more intermediate characters in the transmitted text message back to the one or more special characters in the Latin-based language.

18. The computer program product of claim 14, wherein the computer readable program code functions embedded in said medium is configured to cause the computer to:
insert a first separator marker at the beginning of the coded text; and
insert a second separator marker at the end of the coded text.

19. The computer program product of claim 14, wherein the non-Latin-based language comprises Arabic, Urdu, or Farsi.

20. The computer program product of claim 14, wherein the Latin-based language comprises English or French.

* * * * *